Patented Sept. 15, 1953

2,652,426

UNITED STATES PATENT OFFICE 2,652,426

PREPARATION OF ALKANE PHOSPHONIC ACIDS

Richard D. Stayner, Albany, Calif., assignor to California Research Corporation, San Francisco, Calif., a corporation of Delaware No Drawing. Original application February 4, 1948, Serial No. 6,345. Divided and this application August 28, 1950, Serial No. 181,917

4 Claims. (Cl. 260—500)

The invention described and claimed in this application relates to a new method of preparing long chain alkane phosphonic acids in which an alkyl group containing from 0 to 18 carbon atoms is attached to the phosphorus atom by a carbon-to-phosphorus bond.

This present application is a division of application Serial No. 6,345, filed February 4, 1948, now U. S. Patent 2,587,340, and entitled "Esters of Alkane Phosphonic Acids."

Therein hydroxyalkyl and hydroxyalkyl oxyalkylene esters of long chain alkane phosphonic acids are shown to have been prepared by reacting a long chain alkane phosphonic acid with an olefin oxide, e. g., ethylene oxide, propylene oxide or butylene oxide. These esters are characterized by the presence of oxyalkylene radicals with a hydrogen atom attached to the terminal oxygen atom.

For purposes of illustration, some of these ester compounds may, for example, be shown by the following equation:

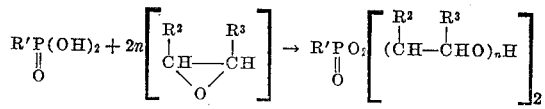

wherein $n$ is an integer of 1 to 10, R' is a long chain alkyl of preferably 10 to 18 carbon atoms, and $R^2$ and $R^3$ represent hydrogen and short chain alkyl groups.

The reaction of alkylene oxides with alkane phosphonic acids may be carried out at atmospheric pressures, and the reaction temperature may be varied between the limits of 20°–200° C. In the preparation of polyglycol esters, a surface catalyst may be used advantageously to increase the reaction rate, or other catalysts such as sulfuric acid, phosphoric acid, nickel sulfate, boron trifluoride, alkyl sulfates, sodium, tertiary amines, etc., may be employed.

I have discovered that the long chain alkane phosphonic acids used for reacting with olefin oxides may be readily prepared from the corresponding dichlorides by reaction with a carboxylic acid according to the equation:

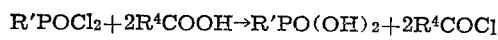

wherein R' is an alkyl group of 10 to 18 carbon atoms and $R^4$ is an alkyl group such that the resulting acid chloride ($R^4$COCl) boils at a temperature below that of the long cain alkane phosphonyl dichloride. Preferably the carboxylic acid is a low molecular weight acid such as acetic, propionic and the like.

This process of my invention yields substantially quantitative amounts of the desired long chain alkane phosphonic acid and, furthermore, yields a valuable acid-chloride by-product in contrast to the prior art by-product of dilute hydrochloric acid which results from hydrolysis of alkane phosphonyl dichloride with water. In carrying out this process, I prefer to mix the ingredients and then heat the mixture for a few minutes at boiling temperatures, preferably under reflux. In compounding our reactant mixtures at least two moles of the carboxylic acid are used for each mole of long chain alkane phosphonyl dichloride. After the heating period mentioned above, the acid-chloride is distilled off, followed by any excess carboxylic acid that may be present, preferably using reduced pressure. The above procedure, I have discovered, yields substantially quantitative amounts of the desired long chain alkane phosphonic acid in a highly purified condition.

By way of illustrating my inventive process for producing long chain alkane phosphonic acid from long chain alkane phosphonyl dichloride using carboxylic acid, the following example is presented:

A mixture of 74.2 parts by weight of octadecane phosphonyl dichloride and 60 parts of glacial acetic acid was prepared and subsequently heated to the boiling point. The acetyl chloride formed in the reaction was then distilled off from the reaction mass. Next, the residue was subjected to reduced pressure distillation to remove excess glacial acetic acid. The final product consisted of 67 parts by weight and was identified as octadecane phosphonic acid ($C_{18}H_{39}PO_3$) by the following analysis:

| | Per cent |
|---|---|
| Phosphorus found | 9.1 |
| Phosphorus calculated | 9.3 |
| Chlorine found | Trace |

The presence of but a trace of chlorine indicated that the final product was substantially pure, long chain alkane phosphonic acid.

The above description is intended to be illustrative only, and any modification which conforms with the spirit of the invention is understood to be included within the scope of the following claims.

I claim:

1. The method of preparing a long-chain alkane phosphonic acid having from 10 to 18 carbon atoms in the alkyl group attached to the phosphorus atom, said method comprising heating to its boiling point a substantially anhydrous mixture of 1 mole of a long-chain alkane phosphonyl dichloride having from 10 to 18 carbon atoms in the alkyl group attached to the phosphorus atom, and at least 2 moles of a low molecular weight saturated aliphatic monocarboxylic acid, the acid chloride of which boils at a temperature below the boiling point of said long-chain alkane phosphonyl dichloride.

2. The method of preparing a long-chain alkane phosphonic acid having from 10 to 18 carbon atoms in the alkyl group attached to the phosphorus atom, which comprises forming a substantially anhydrous mixture of 1 mole of long-chain alkane phosphonyl dichloride having from 10 to 18 carbon atoms in the alkyl group attached to the phosphorus atom, and at least 2 moles of a low molecular weight carboxylic acid having the formula RCOOH, wherein R is an alkyl radical containing from 1 to 4 carbon atoms, the acid chloride of which boils at a temperature below the boiling point of said long-chain alkane phosphonyl dichloride; and heating said mixture to its boiling point to yield said long-chain alkane phosphonic acid and a chloride of said carboxylic acid boiling below the boiling point of said alkane phosphonyl dichloride.

3. The method of preparing long-chain alkane phosphonic acids having from 10 to 18 carbon atoms in the alkane portion thereof, which comprises mixing one mole of long-chain alkane phosphonyl dichloride wherein the alkyl group contains from 10 to 18 carbon atoms with at least two moles of glacial acetic acid; and heating the resulting substantially anhydrous mixture to its boiling point.

4. The method of preparing long-chain alkane phosphonic acids having from 10 to 18 carbon atoms in the alkane portion, which comprises mixing one mole of long-chain alkane phosphonyl dichloride wherein the alkyl group contains from 10 to 18 carbon atoms with at least two moles of non-aqueous propionic acid; and heating the resulting mixture to its boiling point.

RICHARD D. STAYNER.

References Cited in the file of this patent

UNITED STATES PATENTS

| Number | Name | Date |
|---|---|---|
| 2,304,157 | Engelman et al. | Dec. 8, 1942 |
| 2,492,994 | Harman et al. | Jan. 3, 1950 |

OTHER REFERENCES

Kosolapoff, "J. Am. Chem. Soc.," vol. 67, pp. 1180–2 (1945).

Kosolapoff, "Organophosphorus Compounds," pp. 70–71 (1950).